UNITED STATES PATENT OFFICE.

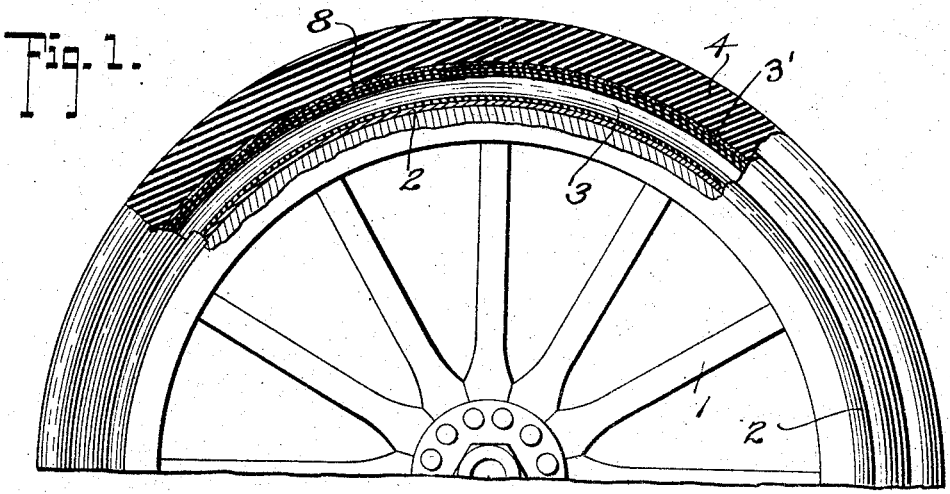
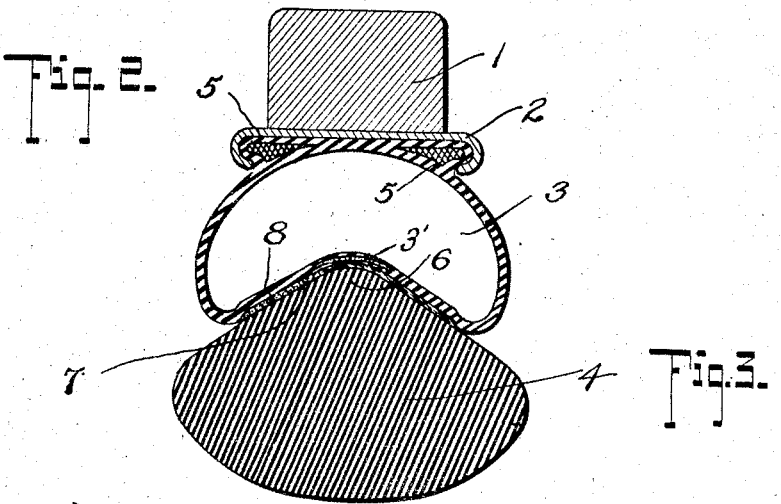
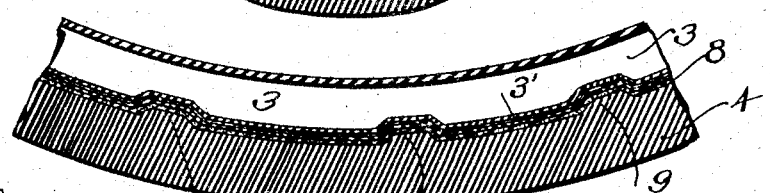

HARRY B. MONTGOMERY, OF HARRISBURG, PENNSYLVANIA.

RESILIENT TIRE.

1,022,966.  Specification of Letters Patent.  Patented Apr. 9, 1912.

Application filed June 29, 1911. Serial No. 636,043.

*To all whom it may concern:*

Be it known that I, HARRY B. MONTGOMERY, a citizen of the United States, residing at Harrisburg, in the county of Dauphin and State of Pennsylvania, have invented certain new and useful Improvements in Resilient Tires, of which the following is a specification.

As is well known in the operation of motor vehicles, and the like, tire expense has become a most serious consideration because of the high cost of rubber and the comparatively short life of tires made of such substance.

The majority of tires most commonly employed now are of the inflatable type and are so readily punctured, aside from the damage incidental to "wear and tear" in use, that a practical substitute for such tires is a desideratum of obvious importance in this art.

The intent of the present invention has been to devise a tire construction of a composite nature, and of the type including inflatable and solid members, the latter to constitute the tread and take up the wear, as well as to prevent punctures, and the former to afford the desired resiliency necessary in an article of this kind.

In carrying out the invention, it is contemplated to provide a peculiar arrangement and construction of inflatable and solid tire members, as above premised, and to associate therewith an insulating member interposed between the inflatable and solid parts. The insulating member is designed to effectively protect the inflatable part of the tire against blow-outs, by preventing heat, due to friction, or contact of the tread with the surface over which it travels, from passing to the inflatable member so as to expand the air in the latter and cause undue pressure therein. The insulating member, however, performs additional functions, the most important of which is to act as a locker, or anti-slipping means tending to prevent creeping of one part of the tire upon the other, which would cause wear and friction with disadvantageous results.

It is a further object of this invention to so design the inflatable and solid members of the tire as to afford a peculiar interlock therebetween, preventing relative circumferential movement, with resulting advantages, that will be more fully appreciated upon reference to the following description, and to the accompanying drawings, in which—

Figure 1 is a partial side elevation and section of a wheel, showing the invention applied thereto; Fig. 2 is a cross section through the rim and tire of this invention; Fig. 3 is a modification more fully presenting the interlocking means between the parts of the tire.

Throughout the following detail description and on the several figures of the drawings, similar parts are referred to by like reference characters.

Describing the invention more specifically, 1 in the drawings denotes a wheel of conventional form such as at present in use, commonly on automobiles, 2 designates the rim of the wheel, which is preferably of the ordinary clencher type, 3 the inflatable member of the tire, and 4 the tread. The member 3 is made preferably of rubber or a combination of rubber and fabric, and is comparatively light in its construction, but sufficiently stout to withstand considerable pressure upon inflation of the same. Said member 3 will have suitable means, designated at 5, for attaching the same to the clencher rim 2. The tread 4 is annular in shape and is formed upon its inner side with an annular protuberance 6 adapted to fit into an annular groove 7 of the inflatable member 3 when the latter is inflated and ready for use. The inside diameter of the protuberance 6 is less than the maximum diameter of the grooved portion 7 of the member 3 whereby, when the member 3 is inflated, the tread 4 will be prevented from displacement by the coöperation of the part 6 with the part 3. The member 3 constitutes an air cushion and is preferably narrower, transversely, than the tread 4, so that the projecting sides of the tread protect the cushion or inflatable portion of the tire, the latter being designed essentially to perform the function of a cushion alone and not to sustain wear such as will be received by the tread 4.

Interposed between the cushion 3 and the tread 4 is the insulating strip 8, the latter being preferably made of sheet asbestos material or equivalent substance, and sufficiently heavy to eliminate likelihood of heat being transmitted from the tread 4 to the inflated cushion 3, such heat being responsible in the ordinary tires for blow-outs of a disastrous nature. It will be apparent that in addition to the function performed by the strip 8 acting as insulation between the tread 4 and cushion 3, said strip constitutes a roughened anti-slipping member coöperating with the parts 3 and 4 to prevent relative circumferential movement of the same.

Necessarily, the strip 8 affords a friction member which, when the parts of the tire are in use, tends to prevent likelihood of circumferential slipping of the tread 4 with respect to the cushion 3. As a further means to prevent the relative movement of the parts 3 and 4, the protuberance 6 may be provided at intervals upon its inner circumference with transverse projections or ribs 9 which embed themselves in the cushion 3 after the latter is inflated. Necessarily, since the projections or ribs 9 form indentations in the cushion 3, and corresponding indentations in the strip 8, the latter is in this manner interlocked with the parts 3 and 4 against any tendency to shift laterally from its normal position between said parts. The members 9 provide interlocking means of an effective form, as will be readily appreciated.

In width, the insulation 8 is somewhat narrower than the width of the contacting portions of the members 3 and 4, so that the insulation does not project from the sides of the tire to render the latter somewhat unsightly. Preferably the ends of the insulating strip 8 overlap somewhat to allow for the expansion of the member 3 after the strip is placed thereon between said member and the tread 4.

While the preferred arrangement and construction of parts has been presented hereinbefore, it is contemplated, however, that the specific construction illustrated and described may be modified in so far as the substances used for making the various parts is concerned, as well as the exact formation and arrangement of said parts, such modification being in accord with the spirit of the invention and scope of the appended claim.

In assembling the parts of the tire, the deflated cushion 3 is slipped over the rim 2 and clenched in the customary way, after which the insulating strip 8 is placed in position, either around the inside of the tread 4 or around the cushion 3, and the latter inflated. The operation of removing the member 8 for renewal or other purposes, or disassembling the parts of the tire, may be quickly and readily performed.

The inflatable member 3 is so formed in the actual manufacture of the same that said member, when inflated, will have a greater pressure at spaced points on opposite sides of the tread 4 than at the base of the groove in said member 3. In other words, the member 3, at the base of the groove, may be reinforced, as shown at 3' and thus rendered less elastic than at the points at opposite sides of said groove. The advantage of this structure necessarily is to concentrate the pressure of the inflatable member 3 at spaced points near opposite sides of the tread 4, thereby rendering less the likelihood of lateral displacement of the tread from the cushion or member 3.

The above construction might be described as one in which the tread member 3 is so formed as to provide spaced annular pressure elements bearing against the tread 4 with great pressure at spaced points on opposite sides of the latter and with little or no pressure at the point of smallest diameter of the tread.

Having thus described the invention, what is claimed as new is:

In a resilient tire, the combination of a hollow inflated cushion of annular form, a rim on which said cushion is mounted, the outer central circumferential portion of the cushion being provided with a reinforcement rendering the same substantially non-elastic whereby when the cushion is inflated, an annular groove is formed in said outer side, and a tread surrounding the cushion and having a portion thereof mounted in said groove so that the hollow portions of the cushion at opposite sides of the reinforcement above mentioned bear against the tread from opposite sides.

In testimony whereof I affix my signature in presence of two witnesses.

HARRY B. MONTGOMERY.

Witnesses:
JAMES S. MONTGOMERY,
HERBERT D. HARRY.

Copies of this patent may be obtained for five cents each, by addressing the "Commissioner of Patents, Washington, D. C."